United States Patent
Ligman et al.

(10) Patent No.: US 9,471,553 B2
(45) Date of Patent: Oct. 18, 2016

(54) AUTOMATICALLY RENDERING WEB OR HYBRID APPLICATIONS NATIVELY

(71) Applicant: International Business Machines Corporation, Armonk, NY (US)

(72) Inventors: Joseph W. Ligman, Wilton, CT (US); Marco Pistoia, Amawalk, NY (US); John Ponzo, Hawthorne, NY (US); Gegi Thomas, Piermont, NY (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 14/027,289

(22) Filed: Sep. 16, 2013

(65) Prior Publication Data
US 2014/0136954 A1 May 15, 2014

Related U.S. Application Data

(63) Continuation of application No. 13/675,056, filed on Nov. 13, 2012.

(51) Int. Cl.
*G06F 17/22* (2006.01)
(52) U.S. Cl.
CPC ................... *G06F 17/2247* (2013.01)
(58) Field of Classification Search
CPC .................................................. G06F 17/2247
USPC ........................................................ 715/234
See application file for complete search history.

(56) References Cited

U.S. PATENT DOCUMENTS

| | | |
|---|---|---|
| 8,176,205 B2 | 5/2012 | Sze et al. |
| 8,365,203 B2 | 1/2013 | Wong et al. |
| 2004/0229200 A1 | 11/2004 | McKeon et al. |
| 2006/0212798 A1 | 9/2006 | Lection et al. |
| 2007/0094604 A1 | 4/2007 | Sahoo |
| 2008/0016187 A1* | 1/2008 | Neil ...................... G06F 9/4443 709/220 |
| 2008/0282142 A1* | 11/2008 | Butlin ....................... G06F 8/38 715/234 |
| 2008/0282172 A1 | 11/2008 | Bayang et al. |
| 2009/0241135 A1* | 9/2009 | Wong .................... G06F 9/4443 719/328 |
| 2011/0119601 A1 | 5/2011 | Knothe et al. |
| 2011/0286343 A1 | 11/2011 | Powell |
| 2012/0137211 A1* | 5/2012 | Lewontin .......... G06F 17/30914 715/236 |

(Continued)

FOREIGN PATENT DOCUMENTS

WO 2005031632 A2 4/2005

OTHER PUBLICATIONS

Mickens, James, and Mohan Dhawan. "Atlantis: robust, extensible execution environments for web applications." In Proceedings of the Twenty-Third ACM Symposium on Operating Systems Principles, pp. 217-231. ACM, 2011.*

(Continued)

*Primary Examiner* — Frank D Mills
(74) *Attorney, Agent, or Firm* — Harrington & Smith

(57) ABSTRACT

An embodiment includes causing elements to be recognized that correspond to one or more browser-supported programming languages in an application. The recognized elements are those elements that can be converted to native user interface elements in the operating system and rendered on a display of a computing device. The elements in the one or more browser-supported programming languages are converted to native user interface elements. The native user interface elements are caused to be rendered on the display of the computing device. Apparatus and computer program products are disclosed.

18 Claims, 17 Drawing Sheets

(56) References Cited

U.S. PATENT DOCUMENTS

| | | |
|---|---|---|
| 2012/0137233 A1 | 5/2012 | Lewontin |
| 2012/0144290 A1* | 6/2012 | Goldman ............ G06F 9/45529 715/234 |
| 2012/0158396 A1 | 6/2012 | Douceur |
| 2012/0158893 A1* | 6/2012 | Boyns ............... G06F 17/30905 709/217 |
| 2012/0159310 A1 | 6/2012 | Chang et al. |
| 2012/0159607 A1 | 6/2012 | Wei et al. |
| 2012/0220263 A1 | 8/2012 | Smith et al. |
| 2012/0229499 A1 | 9/2012 | Tsao et al. |
| 2012/0233239 A1 | 9/2012 | Urim et al. |
| 2013/0067432 A1* | 3/2013 | Feies ........................ G06F 8/38 717/107 |
| 2013/0145357 A1* | 6/2013 | Korycki .................... G06F 8/38 717/172 |
| 2013/0212484 A1* | 8/2013 | Joshi ....................... G06F 9/541 715/740 |
| 2014/0047517 A1* | 2/2014 | Ding ................... H04L 12/1453 726/5 |
| 2014/0075347 A1* | 3/2014 | Banerjee .................. G06F 8/38 715/763 |
| 2014/0082502 A1* | 3/2014 | Rubel .................. G06F 3/0346 715/733 |
| 2014/0096014 A1* | 4/2014 | Johnson ................. H04L 67/36 715/733 |
| 2014/0109115 A1* | 4/2014 | Low ....................... G06F 9/541 719/328 |

OTHER PUBLICATIONS

"Kony Announces the Industry's Most Versatile Mobile Application Management Solution"; Jun. 13, 2012; whole document; Kony; http://www.kony.com/kony-announces-industry%E2%80%99s-most-versatile-mobile-application-management-solution.

"MobiTrans—A Mobile Web Solution Framework"; Jul. 5, 2012; whole document; IPCOM000219522D; http://ip.com/IPCOM00219522.

Bang et al.; "Effective operation and performance improvement methods for IMTP BONDI-based mobile Web widget resources"; Journal of Zhejiang University Science C. Computers & Electronics, vol. 12, No. 10; Oct. 2011; pp. 787-799; DOI: 10.1631/jzusC1000379.

Muller-Wilken et al.; "JBSA: An Infrastructure for Seamless Mobile Systems Integration"; Trends in Distributed Systems: Towards a Universal Service Market; Third International IFIP/GI Working Conference; Sep. 12-14, 2000; Proceedings (Lecture Notes in Computer Science vol. 1890); pp. 164-175.

"Document Object Model (DOM) Level 3 Events Specification" W3CWorking Draft Sep. 6, 2012 http://www.w3.org/TR/2012/WD-DOM-Level-3-Events-20120906/.

* cited by examiner

|  | Web | Hybrid | Native |
|---|---|---|---|
| Programming Language | Web only 510-1 | Web and native, or just Web | Native only |
| Portability and Optimization | High 510-2 | Medium | Low |
| Learning Curve | Low 510-3 | Medium | Medium |
| Distribution | Ubiquitous 510-4 | On iOS, applications need to be externally distributed through the App Store | On iOS, application need to be externally distributed through the App Store |
| Access Native Features | HTML5 continues to include native application platform features, such as advanced graphics, audio and video offline storage, geolocation, and better connectivity control through the Web Socket API | On iOS, applications need to be externally distributed through the App Store by default, only a limited subset can be accessed, but additional device features can be added by creating new native plug-ins | All 510-5 |
| Native Graphics | Indirectly accessible through the HTML5 canvas environment, but some of the platform-specific UI enhancements are not accessible | Indirectly accessible through the HTML5 canvas environment, but some of the platform-specific UI enhancements are not accessible | Fully accessible 510-6 |
| User Experience | Low | Medium | High 510-7 |
| Fidelity to the Native Platform | Low | Medium | High 510-8 |
| Upgrade Flexibility | High 510-9 | Medium | Low |
| Installation Experience | Low | Medium | High 510-10 |
| Audio, Video and Accessibility | Low 510-12 | Medium | High 510-11 |
| cost | Low | Medium | High |

FIG. 5

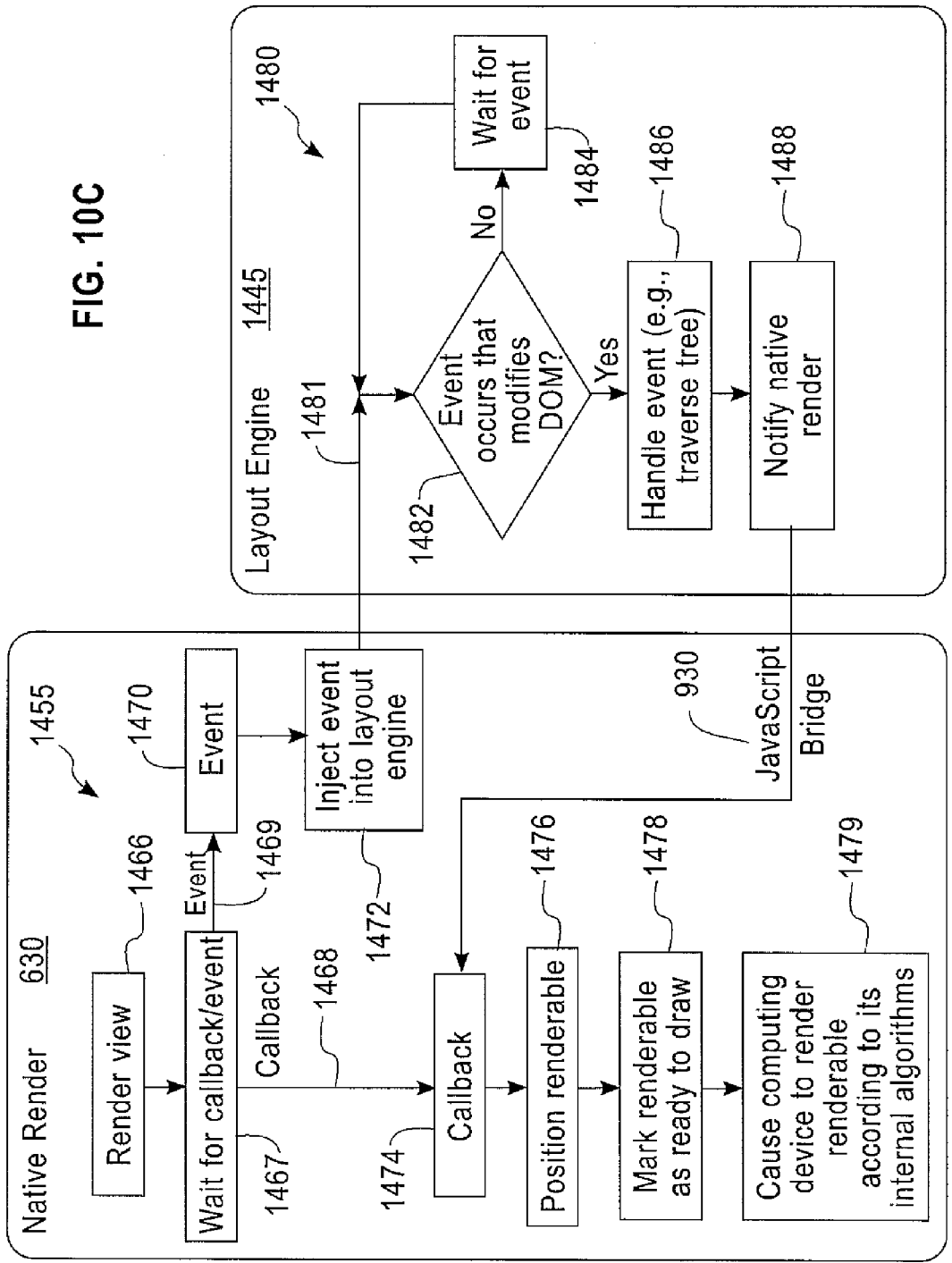

AUTOMATICALLY RENDERING WEB OR HYBRID APPLICATIONS NATIVELY

CROSS-REFERENCE TO RELATED APPLICATIONS

This patent application is a continuation of U.S. patent application Ser. No. 13/675,056, filed on Nov. 13, 2012, which is incorporated herein by reference in its entirety to provide continuity of disclosure.

BACKGROUND

This invention relates generally to rendering web or hybrid applications on computer systems and, more specifically, relates to rendering those applications natively.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms that appear in the text or drawings are defined below, prior to the claims.

Many computing systems, such as personal computers, mobile devices, and tablets, run applications that are based on Web applications. For instance, calendar applications and webmail applications are commonplace. These types of applications have become more prevalent because of the explosion of mobile devices and other types of smaller computing systems such as tablets. Since Web browsers are ubiquitous on all of these computing systems, Web applications are also ubiquitous.

One benefit to a Web application is if the application is updated, then each client automatically accesses the updated application. Contrast this with a native application, where updates to the native application require each device to download and install the updates.

A native application is an application written using native languages specific to the particular platform. For instance, an application intended to run on a personal computer running a Microsoft Windows operating system would be written using a Windows software/driver development kit. An application intended to run on a mobile device would be written using a corresponding platform-specific programming model.

One detriment of Web applications is that they are not native, and therefore are slower and cannot perform many functions that may be performed by native applications. Such functions include accessing native functions and resources, including accessing the UI. One way to improve upon Web applications is by using "hybrid" applications, which combine features of Web applications with some features of native applications. However, these hybrid applications still have limitations, such as using Web views instead of native UI views.

On the other hand, if an application is created in native languages for one platform, the application has to be rewritten into native languages for another platform. This process is time consuming and also tends to fracture the application into two or more different versions, which may be relatively incompatible over time.

BRIEF SUMMARY

An exemplary embodiment is a method performed on a computing device comprising an operating system. The method includes causing elements to be recognized that correspond to one or more browser-supported programming languages in an application. The recognized elements are those elements that can be converted to native user interface elements in the operating system and rendered on a display of the computing device. The method further includes converting the elements in the one or more browser-supported programming languages to native user interface elements, and causing the native user interface elements to be rendered on the display of the computing device.

An exemplary apparatus includes: means for causing elements to be recognized that correspond to one or more browser-supported programming languages in an application, wherein the recognized elements are those elements that can be converted to native user interface elements in the operating system and rendered on a display of a computing device; means for converting the elements in the one or more browser-supported programming languages to native user interface elements; and means for causing the native user interface elements to be rendered on the display of the computing device.

A further exemplary embodiment is a computing device comprising an operating system and comprising one or more memories comprising computer-readable code, and one or more processors. The one or more processors are configured in response to executing the computer-readable code to cause the computing device to perform: causing elements to be recognized that correspond to one or more browser-supported programming languages in an application, wherein the recognized elements are those elements that can be converted to native user interface elements in the operating system and rendered on a display of the computing device; converting the elements in the one or more browser-supported programming languages to native user interface elements; and causing the native user interface elements to be rendered on the display of the computing device.

An additional exemplary embodiment is a computer program product, comprising a computer readable storage medium having computer readable program code embodied therewith, the computer readable program code comprising: code for causing elements to be recognized that correspond to one or more browser-supported programming languages in an application, wherein the recognized elements are those elements that can be converted to native user interface elements in the operating system and rendered on a display of the computing device; code for converting the elements in the one or more browser-supported programming languages to native user interface elements; and code for causing the native user interface elements to be rendered on the display of the computing device.

BRIEF DESCRIPTION OF THE SEVERAL VIEWS OF THE DRAWINGS

FIG. 5 is a table illustrating tradeoffs between native, hybrid and Web programming models;

FIG. 10C is a logic flow diagram of a process for native rendering and event handling and the effect on web rendering for a web or hybrid application;

DETAILED DESCRIPTION

Figure 1:
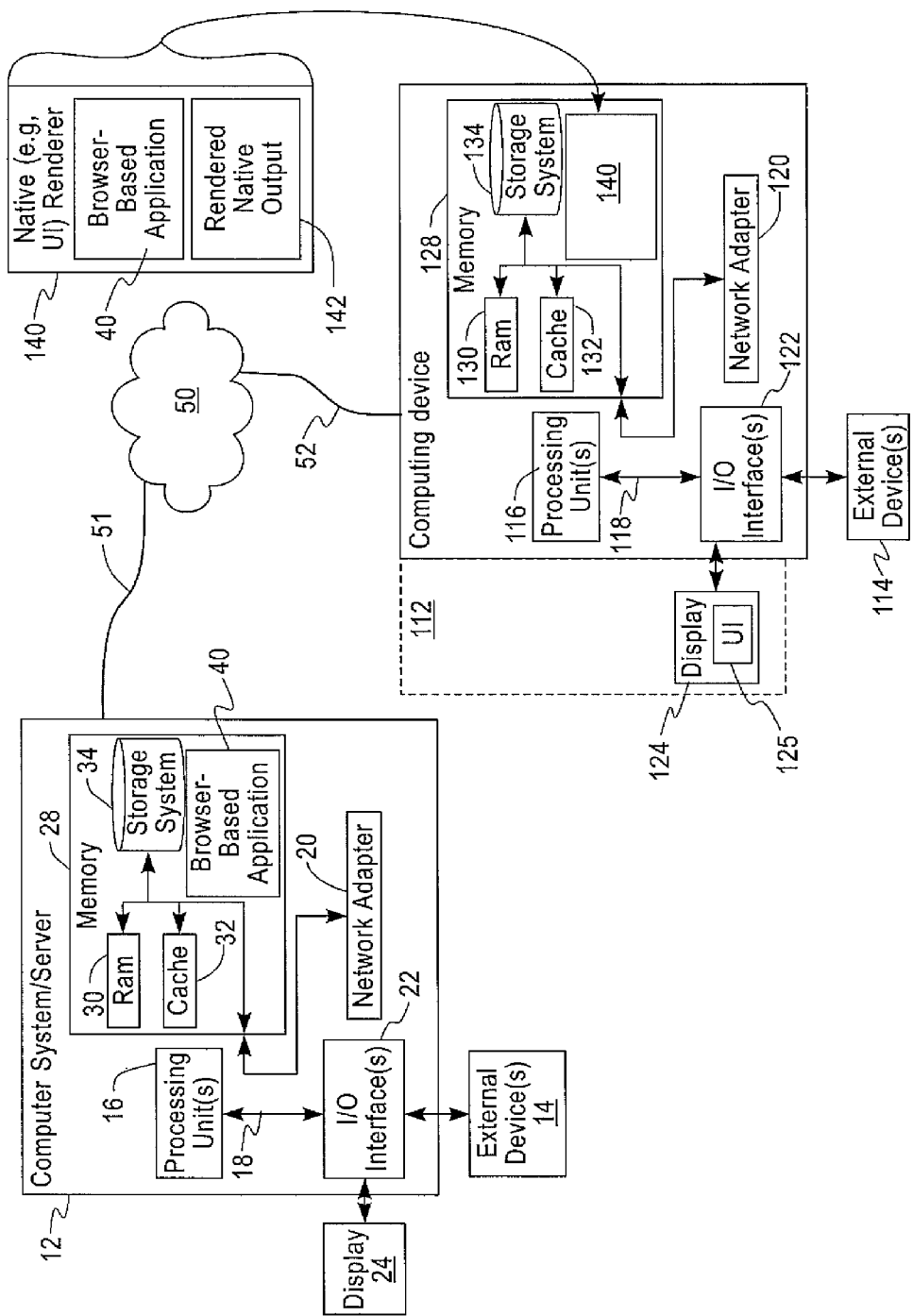
FIG. 1 is a block diagram of a computing device and a server in communication via a network, in accordance with an exemplary embodiment of the instant invention.

Reference is made to FIG. 1, which shows a block diagram of a computing device and a server in communication via a network, in accordance with an exemplary embodiment of the instant invention. FIG. 1 is used to provide an overview of a system in which exemplary embodiments may be used and to provide an overview of an exemplary embodiment of instant invention. In FIG. 1, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to one or more processing units 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computer system/server 12 typically includes a variety of computer system readable media, such as memory 28. Such media may be any available media that is accessible by computer system/server 12, and such media includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a removable, non-volatile memory, such as a memory card or "stick" may be used, and an optical disk drive for reading from or writing to a removable, non-volatile optical disk such as a CD-ROM, DVD-ROM or other optical media can be provided. In such instances, each can be connected to bus 18 by one or more I/O (Input/Output) interfaces 22.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via, e.g., I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The computing device 112 also comprises a memory 128, one or more processing units 116, one or more I/O interfaces 122, and one or more network adapters 120, interconnected via bus 118. The memory 128 may comprise non-volatile and/or volatile RAM, cache memory 132, and a storage system 134. Depending on implementation, memory 128 may include removable or non-removable non-volatile memory. The computing device 112 may include or be coupled to the display 124, which has a UI 125. Depending on implementation, the computing device 112 may or may not be coupled to external devices 114. The display may be a touchscreen, flatscreen, monitor, television, projector, as examples. The bus 118 may be any bus suitable for the platform, including those buses described above for bus 18. The memories 130, 132, and 134 may be those memories 30, 32, 34, respectively, described above. The one or more network adapters 120 may be wired or wireless network adapters. The I/O interface(s) 122 may be interfaces such as USB (universal serial bus), SATA (serial AT attachment), HDMI (high definition multimedia interface), and the like.

In this example, the computer system/server 12 is connected to the computing device 112 via network 50 and links 51, 52. The computing device 112 connects to the computer system/server 12 in order to access the browser-based application 40. A browser application is, e.g., an application designed to enable users to access, retrieve and view documents and other resources on a network 50 and particularly on the Internet. However, the network 50 may be an internal network such as used in many corporations.

Once the computing device downloads 112 downloads the browser-based application 40, the native renderer 140 translates information in the browser-based application into native elements, shown as rendered native output 142. In the examples below, the rendered native output 142 is output produced on the UI 125 on the display 124.

The native renderer 140, in an example, is a program that executes on the processing unit(s) 116. The processing unit(s) 116 (and 16) may be any processing units suitable use in a corresponding platform, such as single- or multi-core processors, digital signal processors, application specific integrated circuits, and the like.

Thus, exemplary embodiments of the invention provide an exemplary benefit that the browser-based application 40 needs only be written or updated once, and all computing devices 112 will have an up-to-date version once the computing devices 112 access and download the browser-based application 40. Furthermore, the native renderer 140 renders native output 142, which means the browser-based application 40 run via the native renderer 140 will be faster than will the browser-based application 40 if the browser-based application 40 is run in a browser.

Figure 2:
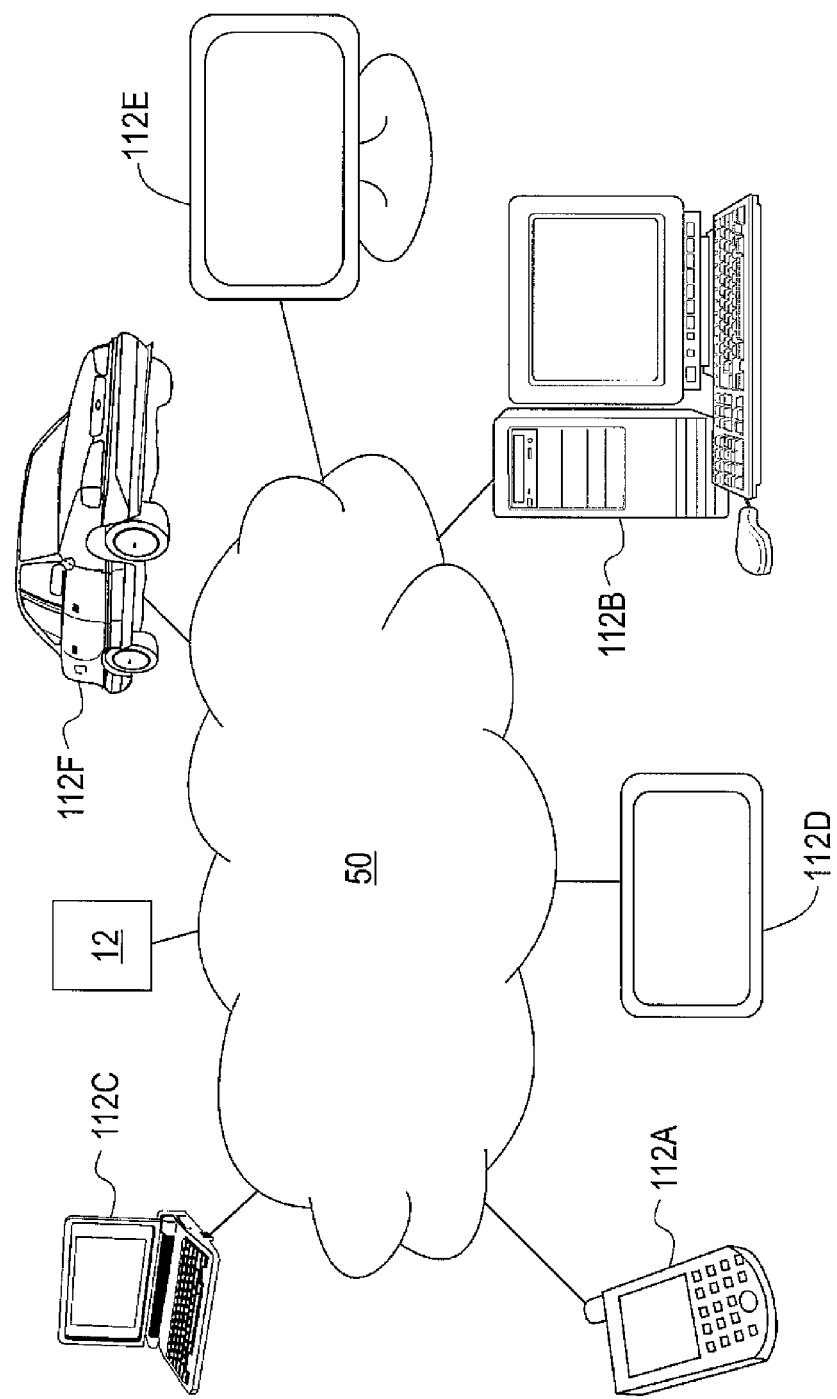
FIG. 2 depicts a networked environment according to an exemplary embodiment of the present invention.

Turning to FIG. 2, a networked environment is illustrated according to an exemplary embodiment of the present invention. In this example, the computer system/server 12 is shown separate from network 50, but could be part of the network. There are A through E different computing devices 112 shown: smartphone 112A, desktop computer 112B, laptop 112C, tablet 112D, television 112E, and automobile computer system 112E. Not shown but equally applicable are set-top boxes and game consoles. These are merely exemplary and other devices may also be used. The native renderer 140 can be configured to execute on each computing device 112.

It is noted that the examples provided below place primary emphasis on mobile devices, such as the smartphone 112A or the tablet 112D. However, the instant techniques may be applied to many other computing devices.

Now that an overview of a system and an exemplary embodiment has been provided, more detail about programming models is provided. Mobile applications running on devices such as smartphones and tablets can be of one of three different types, depending on the programming model used to write the applications:

1. Web applications—the client side of these applications is written using Web programming languages (mainly HTML and JavaScript, which is a lightweight, interpreted, object-oriented language with first-class functions).

2. Native applications—the client side of these applications is written using native languages (Java for the Android platform, Objective-C for the iOS platform).

3. Hybrid applications—the client side of these applications is written as a combination of Web and native languages.

Figure 3:
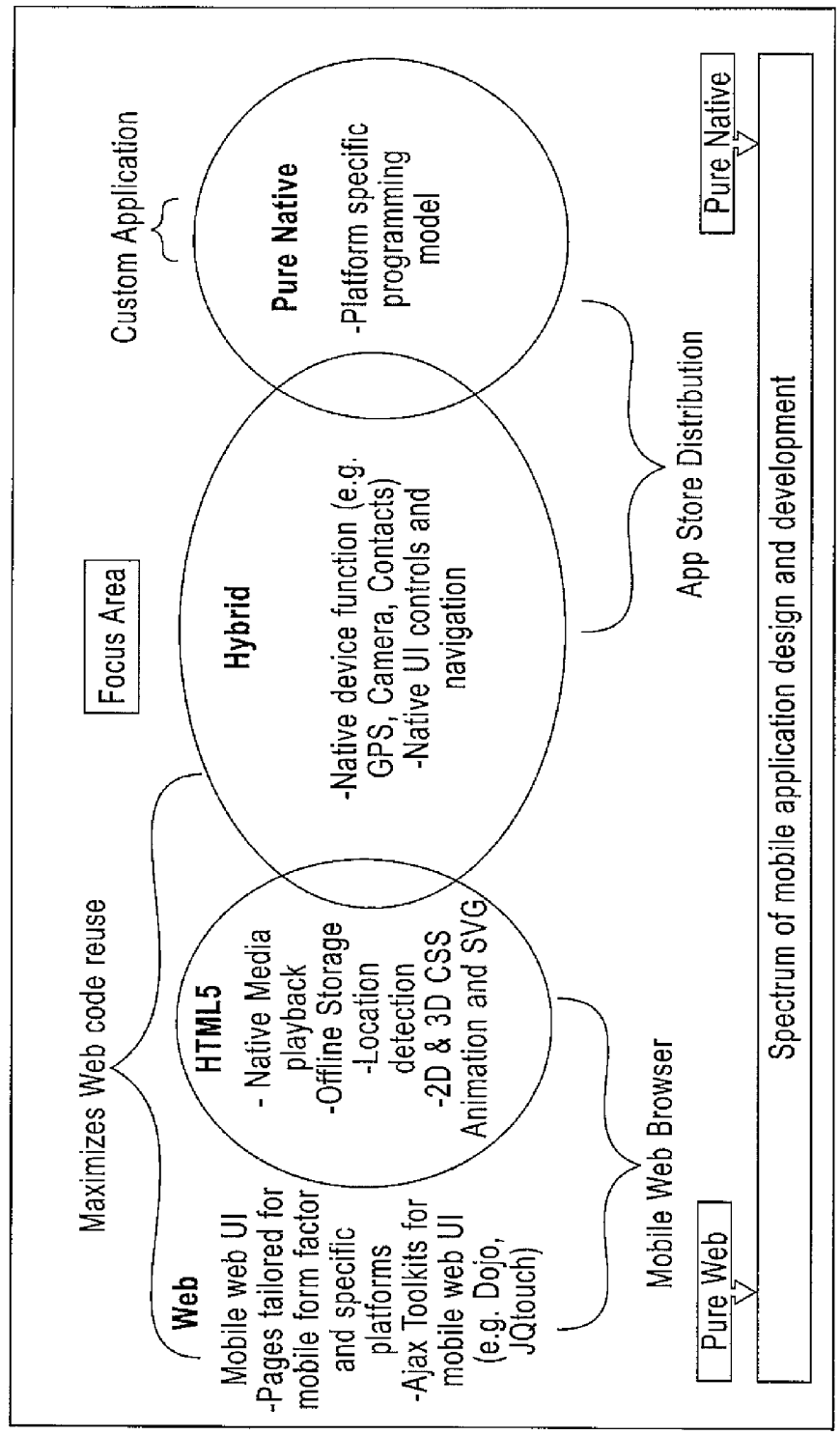
FIG. 3 is a diagram illustrating a spectrum of mobile application design and development.

Web, hybrid and native applications can be positioned on a spectrum of capabilities. In the diagram shown in FIG. 3, Web applications have been split into two subcategories: the applications made merely of mobile Web pages, and those that are based on HTML5. It is noted that FIG. 3 is also applicable to applications for other computing systems, such as desktop, laptop, and "embedded" systems (e.g., in television 112E). There are tradeoffs with each approach:

1. Web applications can run in a browser. This is a very appealing solution because the ability to run in a browser allows developers to stick to the "write once, run everywhere" paradigm. Just using HTML and JavaScript, a developer can write a mobile application that runs on any browser on any platform. However, Web applications are considerably slower than native applications and cannot access native resources except for those allowed by HTML5. Most importantly, a Web-language-based UI is not as appealing as a high-fidelity native interface and cannot provide the high-fidelity user experience expected from mobile devices.

2. Hybrid applications are more powerful than purely Web applications because hybrid applications can access native resources in the devices in which they run. However, hybrid applications typically use Web views and so from a UI perspective these applications are very limited since they do not provide the high-fidelity experience that users expect.

3. Native applications run directly on the operating system of the device. For this reason, native applications are not portable across ecosystems. Developing native applications can be cumbersome because each application has to be developed on each platform. Nevertheless, native applications are very fast and can make use of the native features (including the UI) of the device on which they run. The fidelity of a native application is unsurpassed.

Figure 4:
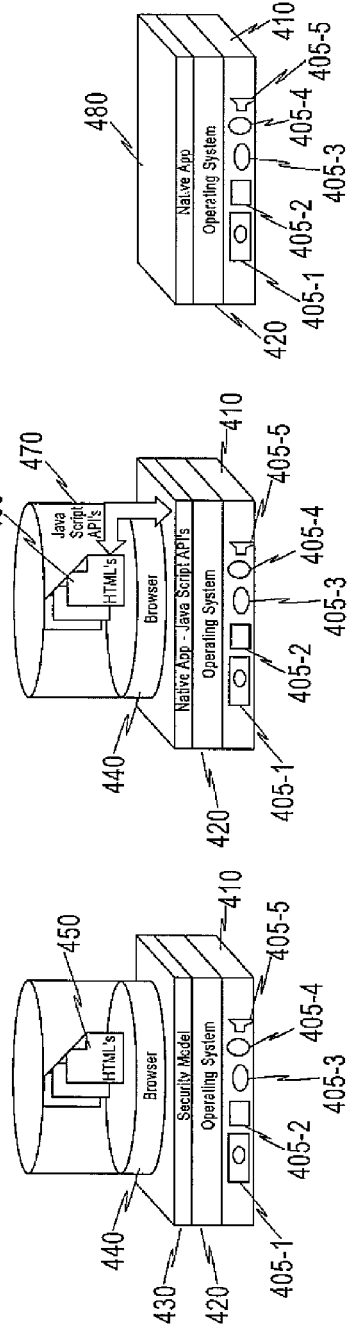
FIG. 4 is chart shown exemplary advantages and disadvantages of programming models.

The chart in FIG. 4 shows the exemplary advantages and disadvantages of each programming model in detail. For web applications, a browser operates on top of a security model 430, which operates on top of an operating system 420, which operates on top of a hardware layer 410. The hardware layer provides access to hardware such as a camera 405-1, disk 405-2, network 405-3, microphone 405-4, and speakers 405-5. The pages 450 include HTML+JS (JavaScript). For the hybrid applications, the browser 440 operates on top of a native application comprising JavaScript APIs, and the pages 450 access the JavaScript APIs as shown by reference 470. For the native application, native application 480 operates on top of the operating system 420.

The following information may be used to guide developers as to how to choose one programming model over another. For web applications, the following are exemplary and non-limiting reasons why a developer may choose this programming model over hybrid or native applications programming models:

1) Applicability is necessary to as many devices and platforms as possible with one codebase.

2) The application is short-lived and requires frequent updates.

3) The standard Web-based programming model is a primary focus.

4) Dynamic Web application distribution and updates are desired.

5) No investment is desired in any platform native programming.

6) The platform-native-like HTML5 capabilities for managing local storage, accessing geolocation, and create advanced graphics are sufficient for the purposes of the application.

7) If an even richer look-and-feel is desired along with mitigation of feature discrepancies among platforms, one can use advanced frameworks such as jQuery (a JavaScript library) and Dojo Mobile (an HTML5 mobile JavaScript framework).

8) It is desired that security and manageability of the application should mirror regular applications.

For hybrid applications, the following are exemplary and non-limiting reasons why a developer may choose this programming model over web or native applications programming models:

1) A Web application already exists and only incremental additions to the application are required to handle device-platform services not available through HTML5, such as camera, contacts, at the like 2) An application store distribution and payment model is desired.

3) No investment is desired in any other programming model.

4) Use of a container layer is desired to normalizes access to all of the required platform services.

5) Applicability is desired to as many devices and platforms as possible with one codebase.

6) For an enterprise, a container may be used for integrated management of specific applications and isolation of all those applications from the rest of the platform.

7) Cost containment is important for ongoing development.

For native applications, the following are exemplary and non-limiting reasons why a developer may choose this programming model over web or hybrid applications programming models:

1) Focus is placed on the highest level of platform integration.

2) Investment in platform-specific libraries and capabilities is possible and desired.

3) The highest-fidelity user experience is desired.

4) The focus is on platform features (for example, UI, or Game Center) that are not available through the hybrid container.

5) The best possible performance is desired.

6) It is desired to create an Android shared service that other applications can use.

The table in FIG. 5 illustrates exemplary tradeoffs between the Web, hybrid, and native programming models. The twelve parts 510-1 through 510-12 are those parts that make a given programming model more attractive than the others. The exemplary embodiments presented in this invention assemble all the advantages highlighted by the parts 510 the table of FIG. 5.

Consumers of applications including mobile applications are used to high-fidelity interfaces and expect nothing less in enterprise applications. User interfaces vary significantly across devices and their operating systems. Web and hybrid applications that render well on desktops and laptops often render very poorly on smartphones, for instance, and even more poorly on tablets, where each UI inconsistency is magnified. The user interface needs to reflect the degree of literacy of the potential users. User experience is affected by connectivity and should be optimized for such connectivity. Therefore, the best solution would be one that would allow a developer to write an application using the Web programming model, while the application renders natively on any device on which the application runs. This is exactly what exemplary embodiments of the instant invention do. In fact, the exemplary embodiments of the instant invention present a framework for dynamically rendering Web applications natively on any device and platform on which the application runs. Implementation may be made to work on mobile platforms such as iOS (an operating system by the Apple company) and Android (an operating system by Google) or non-mobile platforms such as Windows (an operating system by Microsoft) or other non-mobile platforms for televisions, set-top boxes, and the like. This solution indeed allows developers to write mobile applications using a Web programming model and have those applications render natively on any operating system and device, through a dynamic translation.

Thus, in an exemplary embodiment, a framework is proposed that takes any application written using a combination of Web languages (e.g., HTML5 and JavaScript) and dynamically translates its rendering making the application native. A web application is an application that is accessed by users over a network such as the Internet or an intranet. Specifically, a web application is coded in a browser-supported programming language (such as JavaScript, combined with a browser-rendered markup language like HTML) and reliant on a web browser to render the application executable. With an exemplary solution, developers can write an application using Web programming languages (which are portable across the various platforms). This helps developers write applications once and have then run everywhere. At runtime, our solution dynamically translates the UI of the application and makes it native regardless of the platform on which the application is executed. For example, on an Android device, the application will render natively, using the Android user-experience model, and similarly, the application will render natively on an iOS device, using the iOS user-experience model.

The technical approach of an exemplary embodiment of the instant invention includes a JavaScript-based generation of a native user interface, combined with a dynamic native UI rendering engine and JavaScript API access to the UI rendering engine.

Exemplary and non-limiting advantages of the instant invention include one or more of the following:

1) JavaScript-based applications can dynamically generate native UI at runtime.

2) Unlike a "Cross Compilation" approach, application logic can be dynamically server-driven.

3) There is no proprietary language to learn or it not required to port existing applications to provide a user with native look and feel, gesturing, transitions, navigation, layout, animation, "rubber banding", better performance, preloading/caching.

4) New JavaScript or other Web code can be dynamically fetched, and augment the native UI.

Figure 6:
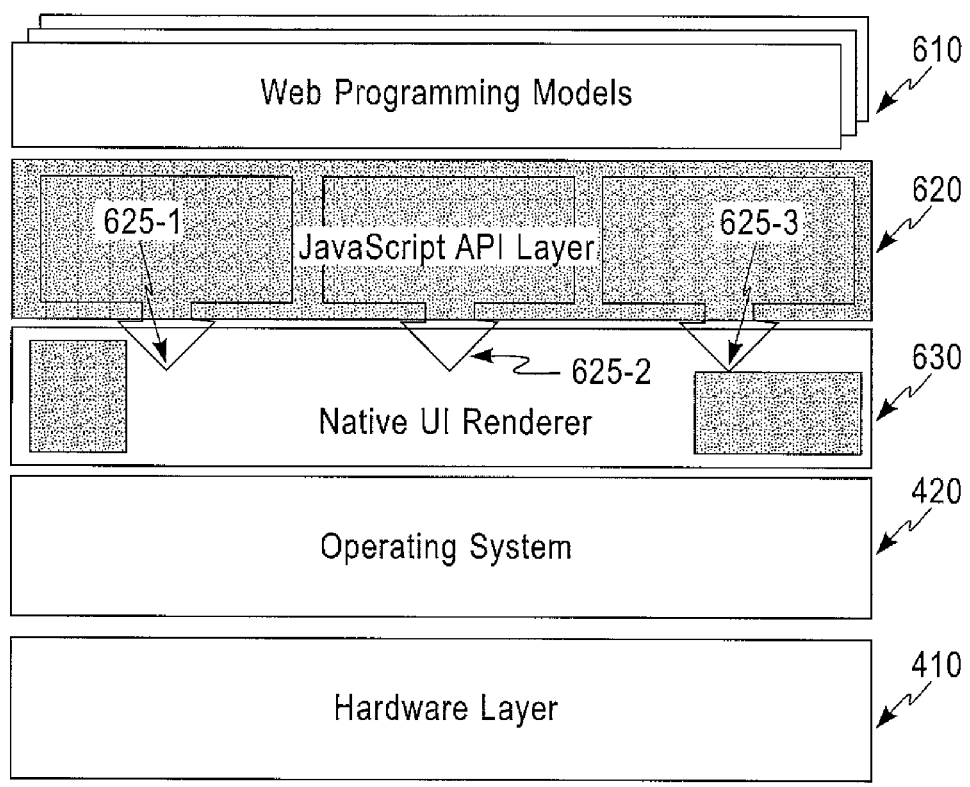
FIG. 6 is a block diagram of an architecture of an exemplary embodiment of the instant invention for automatically rendering web or hybrid applications natively.
Figure 7:
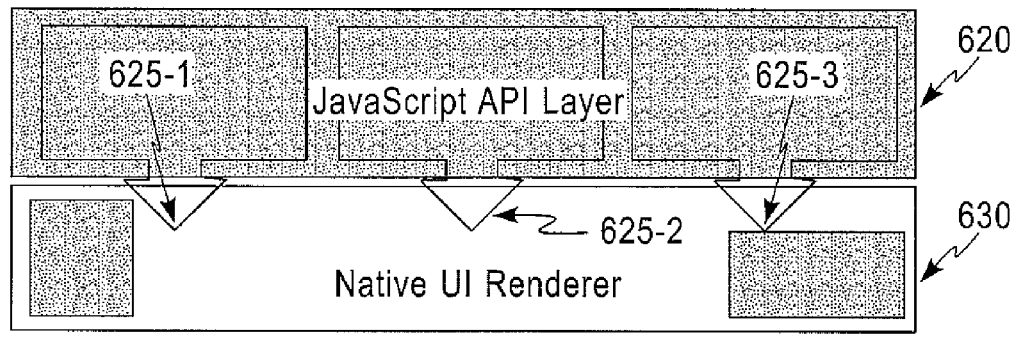
FIGS. 7 and 8 are two exemplary use cases for the architecture shown in FIG. 6, in accordance with exemplary embodiments of the instant invention.
Figure 8:
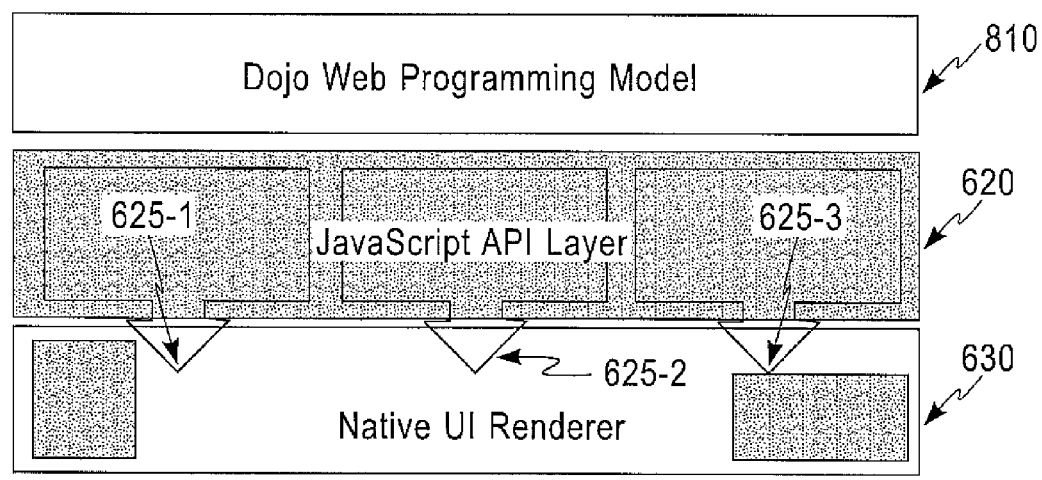

FIGS. 6-8 provide an overview of an exemplary architecture for automatically rendering web or hybrid applications natively. FIGS. 9-15 provide more detailed architecture and process examples for automatically rendering web or hybrid applications natively.

Turning to FIG. 6, a block diagram is shown of an architecture of an exemplary embodiment of the instant invention. This example includes a number of Web programming models 610, a JavaScript API layer 620, and a native UI renderer 630. In an example, the native UI renderer 630 includes a hybrid container that allows for dynamic and automatic native UI generation. There are a number of entry points 625, of which entry points 625-1, 625-2, and 625-3 are shown, from the JavaScript API layer 620 to the native UI renderer 630. In the following examples, the native renderer 140 shown in FIG. 1 is illustrated as placing primary emphasis on UI interactions and therefore is referred to therefore as native UI renderer 630.

The native UI renderer 630 is implemented in an exemplary embodiment as a layer operating above and with the operating system 420, which operates above and with the hardware layer 410 (see FIG. 4). The layer 630 is a native UI rendering engine decoupled from the Web programming models 610. The layer 620 is a JavaScript-based library providing access to a dynamic UI rendering model, the native UI renderer 630. This can be used to apply a native UI rendering engine to any supported hybrid-container programming model. Finally, the top layer 610 allows for multiple Web programming models to be plugged on top of this exemplary embodiment for maximum flexibility and reusability.

There are a number of use cases, two of which are illustrated by FIGS. 7 and 8. FIG. 7 illustrates the entry point 625 to the native UI renderer 630 can happen directly through the JavaScript API layer 620. In fact, the JavaScript API layer 620 may be a general-purpose JavaScript API that can very flexibly auto-generate native controls with or without any specific Web programming model. FIG. 8 illustrates that the entry points 625 to the native UI renderer 630 happen through a Web programming model 610, for example the Dojo programming model 810. Dojo and Dojo-style extensions allow for dynamically rendering Web applications with native controls.

Figure 9:
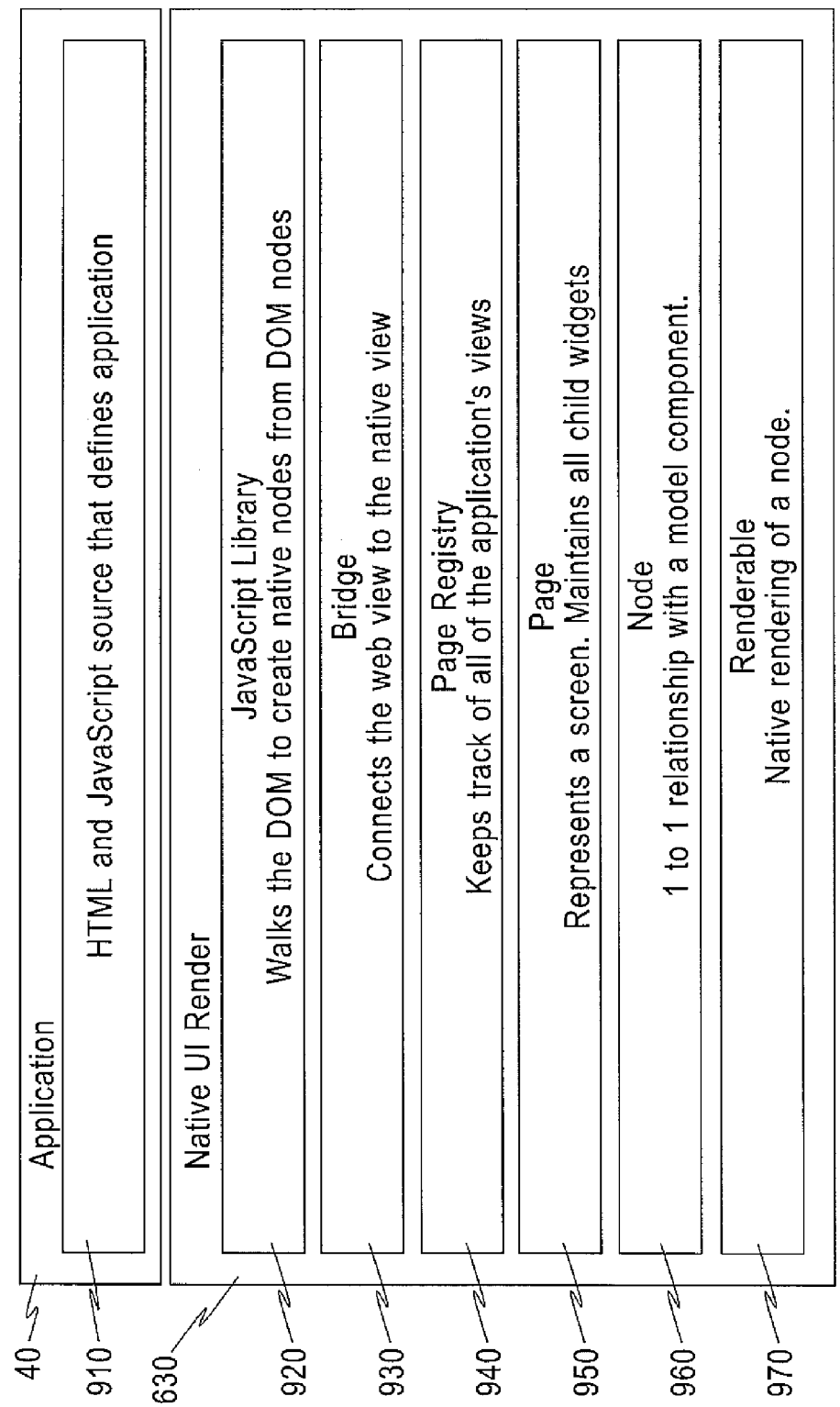
FIG. 9 is a block diagram of a generalized architecture for automatically rendering web or hybrid applications natively, in accordance with an exemplary embodiment.

Turning to FIG. 9, this figure is a block diagram of a generalized architecture for automatically rendering web or hybrid applications natively, in accordance with an exemplary embodiment. In this example, the application 40 (see also FIG. 4) comprises HTML and JavaScript source code that defines the application 40. The native UI renderer 630 comprises a JavaScript library, a bridge 930 (also called a JavaScript bridge herein), a page registry 940, a page 950, a node 960, and a renderable 970. The JavaScript library 920 "walks" a DOM (as explained in more detail below) to create native nodes from DOM nodes. As is known, a DOM is a cross-platform and language-independent convention for representing and interacting with objects in HTML, XHTML and XML. The JavaScript bridge 930 connects a Web view to the native view. The page registry 940 keeps track of all the views of the application. The page 950 represents a screen and maintains all child widgets. The node 960 has a one-to-one (1 to 1) relationship with a model component (i.e., from the DOM). The renderable 970 is a native rendering of a node and correspond to native user interface elements that can be rendered on a display.

Figure 10A:
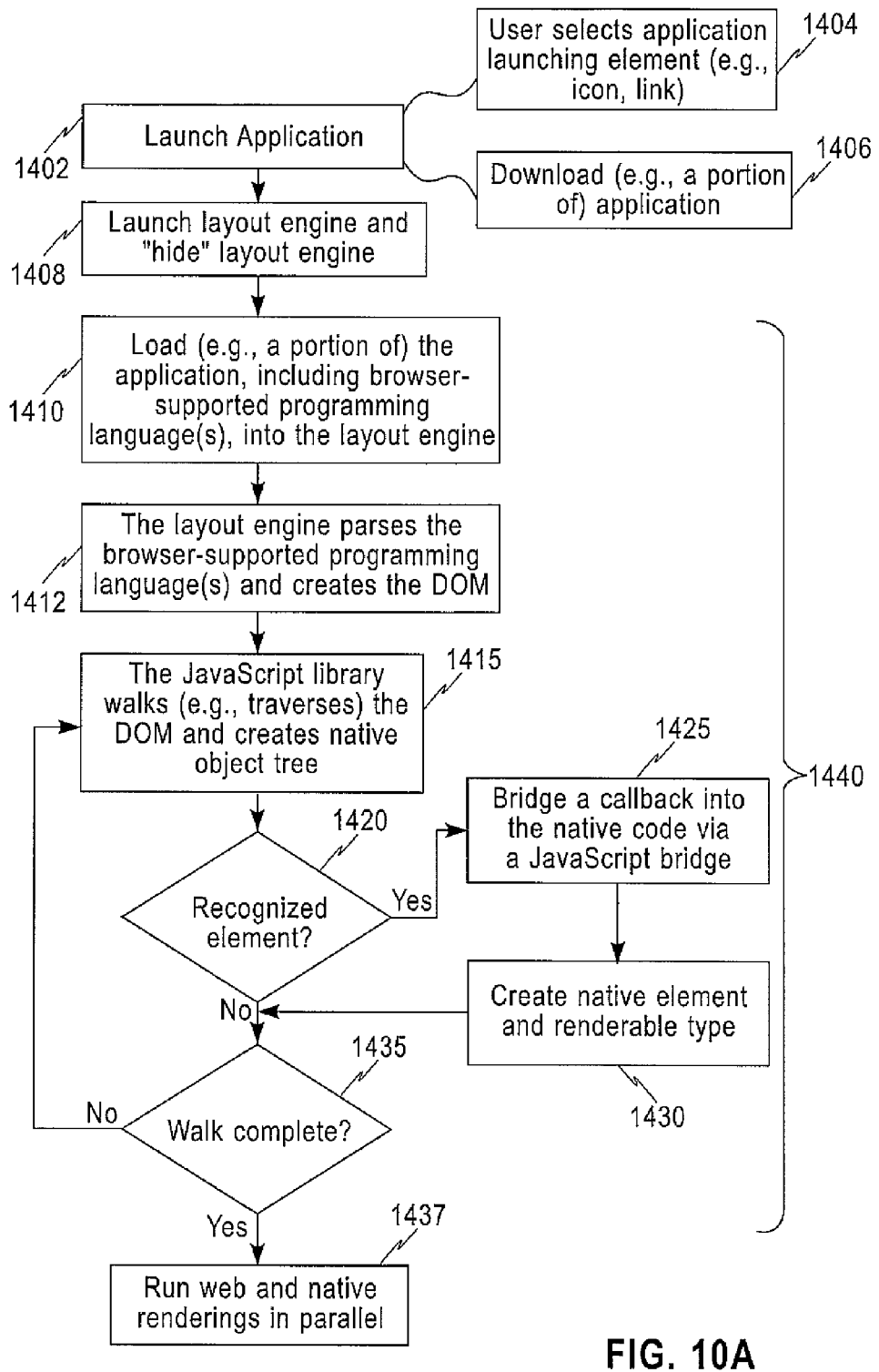
FIG. 10A is a logic flow diagram of for automatically rendering web or hybrid applications natively.
Figure 10B:
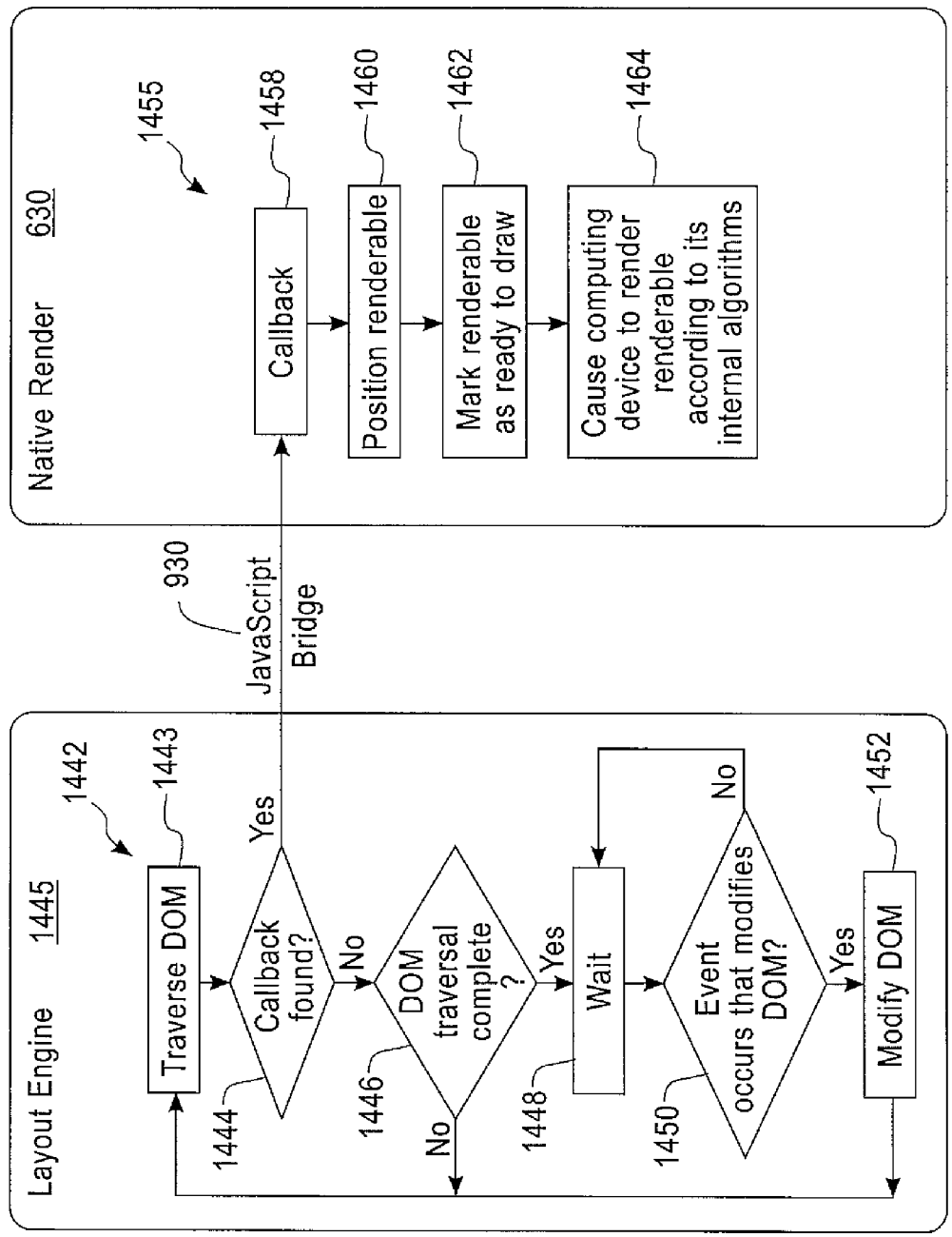
FIG. 10B is a logic flow diagram of a process for DOM traversal and corresponding web rendering and its effect on native rendering for a web or hybrid application.

FIGS. 10A, 10B, and 10C are logic flow diagrams that illustrate the operation of an exemplary method, a result of execution of computer program instructions embodied on a computer readable memory, and/or functions performed by logic implemented in hardware, in accordance with exemplary embodiments of this invention. FIG. 10A is a logic flow diagram of for automatically rendering web or hybrid applications natively. In an exemplary embodiment, rendering a web or hybrid application may be performed by performing two renderings in parallel: a native rendering, a process for which is illustrated in FIG. 10B, of the web or hybrid application 40; and a web rendering, a process for which is illustrated in FIG. 10C, of the web or hybrid application 40.

Turning to FIG. 10A, in block 1402, an application is launched. The application may be launched by a user selecting a launching element, such as an icon, link or any other suitable element, as indicated in block 1404. The launching of the application may include downloading all or a portion of the application 40.

In an exemplary embodiment, the launching of the application creates an instance of a native application controller. The native application controller in this example includes or at least controls the native UI renderer 630. The native application controller may perform or cause to be performed the downloading in block 1406. The native application controller can perform block 1408, to launch a layout engine and to "hide" the layout engine. The hiding of the engine is described in more detail below. In block 1410, the native application controller loads (e.g., a portion of) the application, including browser-supported programming language(s) (as indicated by 910), into the layout engine. The layout engine is an engine that performs web rendering of the application 40. The layout engine may be represented by other names, depending on platform, such as WebView or web rendering engine.

Figure 11:
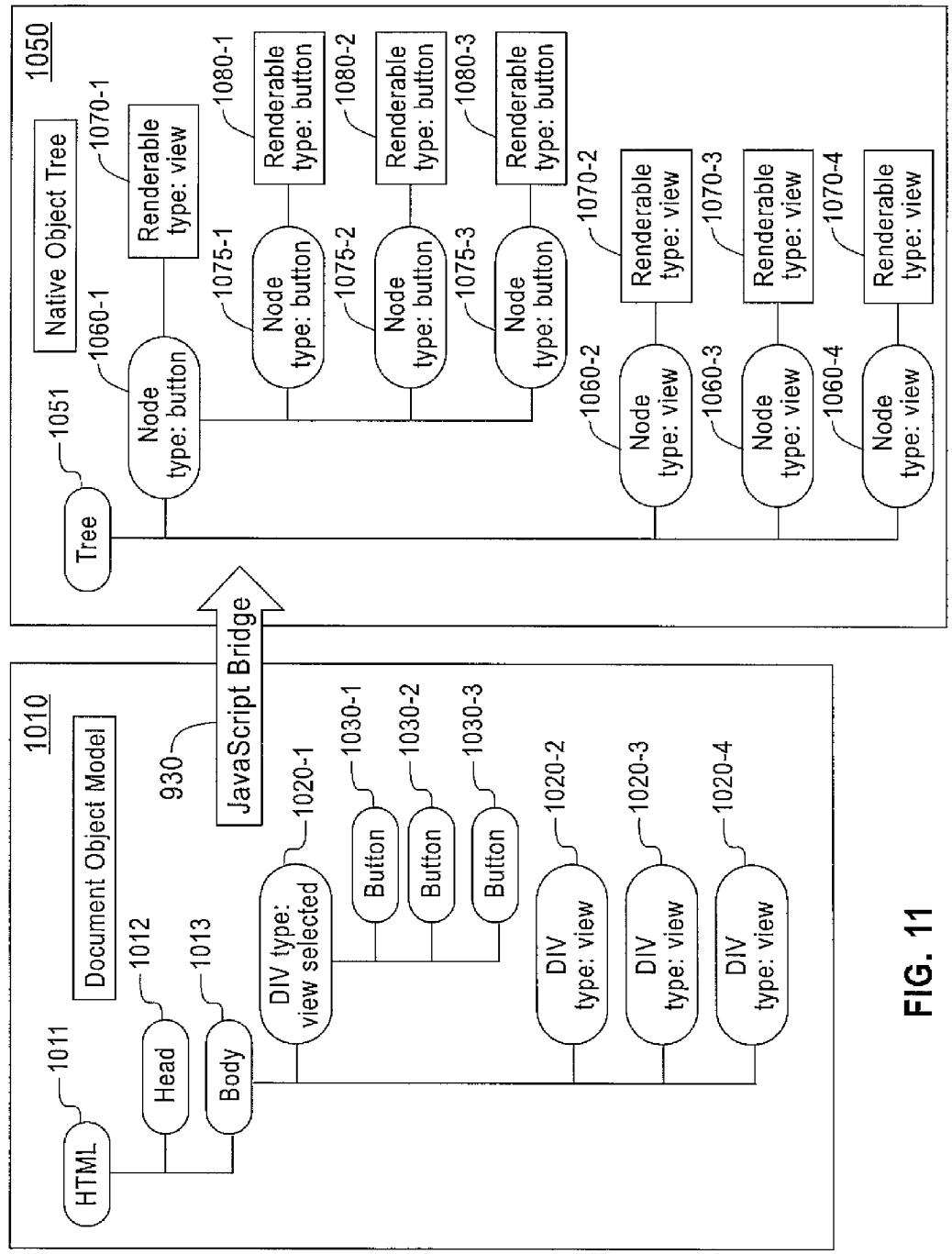
FIG. 11 shows an example of a "shadow" tree that is created from a DOM tree.

The layout engine in block 1412 parses the browser-supported programming language(s), examples of which are shown in 910, and creates the DOM. An example of a DOM is illustrated in FIG. 11 and described below. In block 1415, the JavaScript library 920 walks (that is, traverses) the DOM to create a native object tree (an example of which is shown in FIG. 11 and described below). It is noted that both the DOM and the native object tree are dynamic and may be modified during web application rendering, e.g., based on user input. In block 1420, if the JavaScript library 920 finds a recognized element (block 1420=Yes) in the browser-supported language, the JavaScript library bridges (block 1425) a callback into the native code (e.g., a portion of the native UI renderer 630 performing the native rendering process) via a JavaScript bridge 930. That is, the callback occurs from the JavaScript library through the bridge 930 to the native code. The recognized elements can be any renderable element, often called "widgets", in the browser-supported languages. The JavaScript library 920 is used in the traditional meaning of a computer software library. The library encapsulates the JavaScript needed to communicate from a layout engine to the native version of the application. In the native object tree, the JavaScript library creates (block 1430) a native element and a renderable type, both of which correspond to the recognized element. If there is no recognized element at a current walking position (block 1420=No) or if block 1430 has been performed, it is determined if the walk is complete in block 1435. If the walk is not complete (block 1435=No), the flow continues in block 1415. If the walk is complete (block 1435=Yes), the flow continues in block 1437.

Before proceeding with additional description of FIG. 10A, it is helpful at this point to refer to an example of a DOM tree (created in block 1412) and a native object tree (created via blocks 1415-1435). Referring to FIG. 11, this shows an example of a "shadow" tree (native object tree 1050) that is created from a DOM tree 1010. It is noted that the DOM tree 1010 may also be referred to as the DOM herein. In response to the DOM tree 1010 being created (or at the same time the DOM tree 1010 is created), the JavaScript bridge 930 performs the operations (as described in FIG. 10A) of walking the DOM tree 1010 and creating new native instances of objects. The native instances include in an example a model, illustrated by the tree 1050, and a renderable view object (e.g., as defined by a native element and renderable type).

In this example, the DOM tree 1010 includes an HTML object 1011, a head object 1012, and a body object 1013. The body object 1013 has a number of view objects 1020-1, 1020-2, 1020-3, and 1020-4. The view node 1020-1 additionally has button objects 1030-1, 1030-2, and 1030-3. The exemplary native object tree 1050 is an exemplary result that occurs after JavaScript bridge 930 scans the DOM tree 1010 and creates new native instances. The native object tree 1050 has a tree object 1051, and a number of view objects 1060-1, 1060-2, 1060-3, and 1060-4, each of which corresponds to an object 1020. Each of the view objects 1060 has a corresponding renderable type 1070 (of "view"). Renderable types correspond to UI elements in the DOM, and all HTML/JavaScript UI elements should have a one to one mapping with native UI elements in the native object tree 1050. Native UI elements in this example are the views 1060 (e.g., pages) and the buttons 1075. Once these are rendered, the views 1060 will be rendered as pages and the buttons 1075 will be rendered as buttons (per the formatting of the platform as defined by, e.g., the operating system). The view object 1060-1 has three button objects 1075, each of which corresponds to a button 1030, and each of which has a corresponding renderable type 1080 of "button". In this example, the nodes 960 are nodes 1060 and 1070. This simple example illustrates four views: the first view has three buttons; and the other three views are blank.

The JavaScript bridge 930 also inserts callbacks in the DOM to callback elements (e.g., objects) in the native object tree 1050. This is explained in more detail below.

Returning to FIG. 10A, blocks 1410 through 1435 are considered to be a tree creation phase 1440, as this phase creates at least a portion of the DOM tree 1010 and native object tree 1050. Once the trees 1010 and 1050 are created (or some portion of them is created), then in block 1437, the web and native renderings are performed in parallel in an exemplary embodiment. In an exemplary embodiment, the layout engine is hidden (see block 1408), i.e., from a user using the computing device 112, while the rendered native output 142 is shown to the user via a display 124 and the UI 125. Techniques for hiding the layout engine may vary by platform, but suitable techniques include rendering in a video scratch area, rendering outside the viewable area of the screen, or disabling output from the layout engine to the display 124. In another exemplary embodiment, the layout engine could be executed on a device different (e.g., the computer system/server 12) from the computing device 112, while the rendered native output 142 is shown to the user via a display 124 and the UI 125.

Regarding the parallel renderings for block 1437, FIG. 10B is a logic flow diagram of a process for DOM traversal and corresponding web rendering and its effect on native rendering for a web or hybrid application, while FIG. 10C is a logic flow diagram of a process for native rendering and event handling and the effect on web rendering for a web or hybrid application. For ease of reference, first FIG. 10B will be described and then FIG. 10C will be described. However, both flows occur generally at the same time. In FIG. 10B, flow 1442 is performed by a layout engine 14645, and flow 1445 is performed by native renderer 630. The layout engine 1445 performs web layout, the output of which is hidden in an exemplary embodiment in accordance with block 1406 of FIG. 10B.

In block 1444, the layout engine 1445 traverses a DOM tree 1010. In block 1444, the layout engine 1445 determines if a callback is found. If so (block 1444=Yes), a callback is performed via JavaScript bridge 930, to be described below in reference to flow 1455. If a callback is not found (block 1444=No), the flow continues in block 1446, were it is determined if the DOM traversal is complete (e.g., for this portion of a browser-based application 40). If not (block 1446=No), the flow continues in block 1443. If DOM traversal is complete (block 1446=Yes), the layout engine 1445 waits for an event (block 1448). If an event occurs that does not modify the DOM (block 1450=No), the flow continues in block 1448. If an event occurs that modifies the DOM (block 1450=Yes), in block 1452, the layout engine 1445 modifies the DOM and flow proceeds to block 1443.

For examples of possible events that might occur, see Document Object Model (DOM) Level 3 Events Specification, W3C Working Draft, 6 Sep. 2012.

If the web layout changes, the native layout must also change. In an exemplary embodiment, this may be considered roughly to be a model view controller, where the DOM is the model and the view (layout) is derived from the DOM for renderable elements. In order to change the native layout, for flow 1455, a callback 1458 is performed via the JavaScript bridge 930. The callback starts a process whereby a renderable is positioned (block 1460), the renderable is marked as ready to draw (block 1462), and the computing device is caused to render the renderable according to its internal algorithms (e.g., as per the OS 420).

FIG. 10C can be considered to start, at least initially, after block 1464 of FIG. 10B. There is likely some interplay between FIGS. 10C and 10B, however, as both FIGS. 10C and 10B involve events that modify the DOM (see block 1482 of FIG. 10C and block 1450 of FIG. 10B). The native renderer 630 performs flow 1465 and the layout engine 1445 performs flow 1480. In block 1466, the native renderer 630 renders a view. In block 1467, the native renderer 1466 waits for a callback or event to occur. If a callback occurs (indicated by callback 1468), the native renderer performs the callback in block 1474, which starts the process of positioning a renderable (block 1476), marking the renderable as ready to draw (block 1478), and causing the computing device (block 1479) to render the renderable according to its internal algorithms (as defined by, e.g., the OS 420). If an event occurs (indicated by event 1469), the event is processed (block 1470) and in block 1472, the event is injected into the layout engine 1445. Events include a user selecting an option from a pop-up menu, swiping to another screen, and the like.

Regarding the layout engine 1445, the layout engine 1445 reacts to the injected event 1481 by determining if the event that occurs is one that modifies the DOM (block 1482). If not (block 1482=No), the layout engines 1445 waits in block 1484 for such an event. Otherwise, if an event has occurred that modifies the DOM (block 1482=Yes), in block 1486, the layout engine handles the event (e.g., by traversing the DOM tree) and in block 1488 notifies the native renderer via a callback 1474 performed by the JavaScript Bridge 930.

Figure 12:
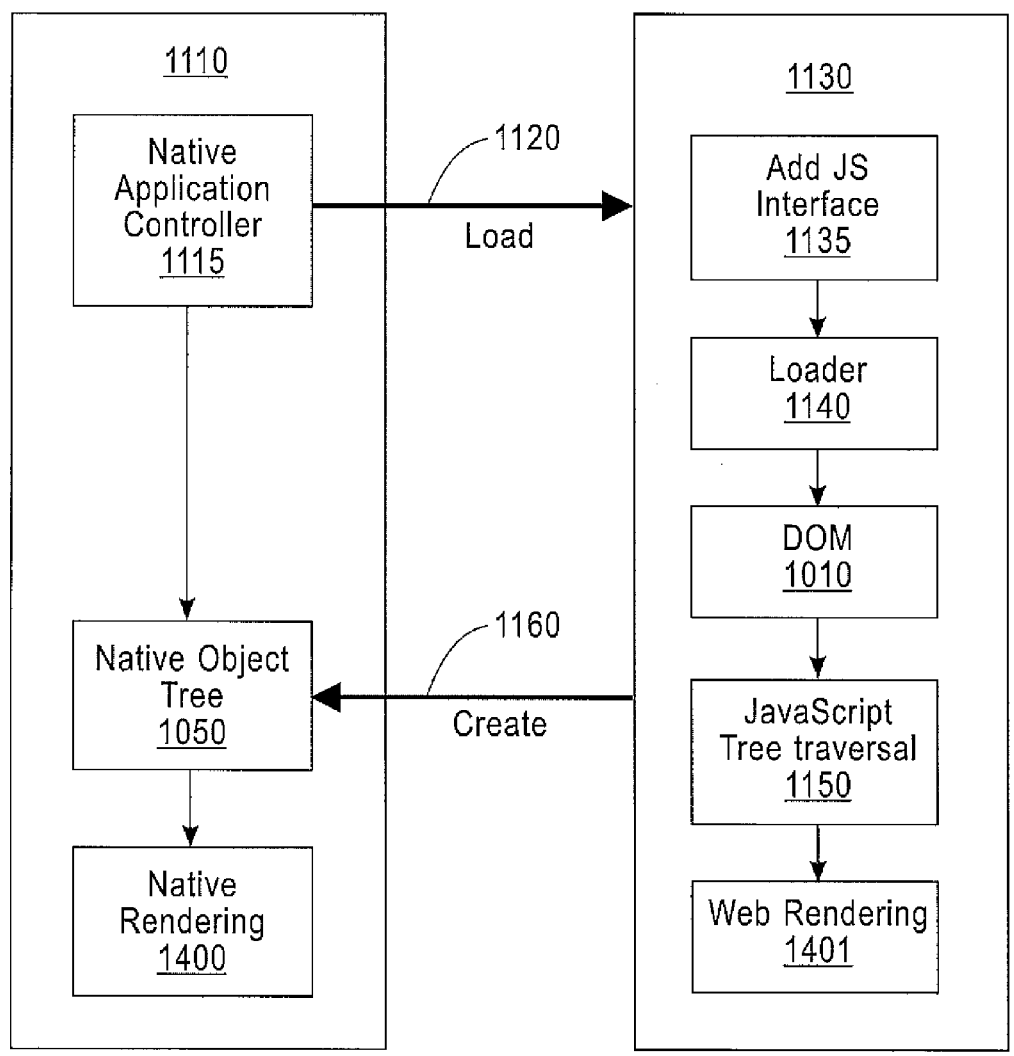
FIG. 12 is a block diagram of an example of a split rendering in accordance with an exemplary embodiment.

Turning now to FIG. 12, this figure shows an example of a split rendering in accordance with an exemplary embodiment and is another way to view portions of FIGS. 10A, 10B, and 10C. The split rendering shown in FIG. 12 shows an example of the main modules and operations that could perform the flows shown in FIGS. 10A, B, and C. Reference 1110 indicates modules or operations that occur in the native programming model, and reference 1130 indicates the modules or operations that occur in the web/hybrid rendering model. The native programming model 1110 includes a native application controller 1115, a native object tree 1050, and a native rendering process 1400. The web/hybrid rendering model 1130 includes an add JS interface 1135 (e.g., to add a JavaScript interface for the application 40), a loader 1140, the DOM tree 1010, a JavaScript tree traversal operation 1150, and a web rendering process 1401. The native application controller 1115 implements a load 1120, which causes a load (e.g., by loader 1140) of the source 910 (e.g., JavaScript) into the layout engine 1445 and starts at least the loader and subsequent operations shown in web/hybrid rendering model 1130.

In an example, a custom JavaScript object, i.e., a version of the JavaScript library 920 of FIG. 9 and incorporated into or controlled by the native application controller 1115, traverses (block 1150) the DOM 1010 after the markup (e.g., HTML 910 in the application 40) is parsed and the DOM tree 1010 is created. JavaScript callbacks are made (e.g., via the create 1160) to the native code (in native object tree 1050) as renderable types are found in the DOM 1010. The call backs are realized through objects registered with the layout engine 1455 owned (in an object-oriented programming sense) by the client application 40.

Figures 13, 14:
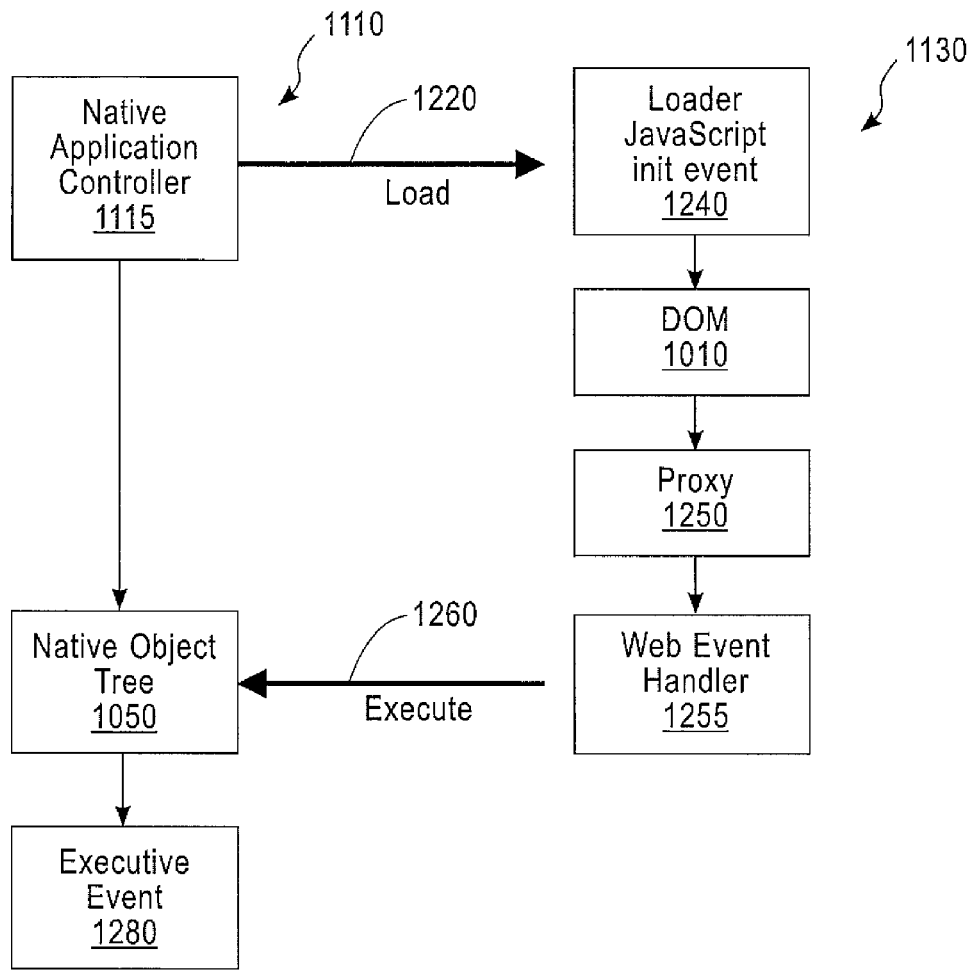
FIG. 13 is a block diagram of an example of event propagation, in accordance with an exemplary embodiment.
FIG. 14 shows a simplified example of injecting a mouse click event into an instantiated web view.

FIG. 13 is a block diagram of an example of event propagation, in accordance with an exemplary embodiment. This is another view of parts of FIGS. 10A, B, and C. Events are propagated through the DOM tree 1010 by injecting JavaScript (1220) into a layout engine object corresponding to the application 40. This is also illustrated by JavaScript call 1465 in FIGS. 10B and 10C. The native programming model 1110 includes a native application controller 1115, a native object tree 1050, and an execute event 1180. The operations in web/hybrid rendering model 1130 include a loader JavaScript: init event operation 1240, a DOM tree 1010, a proxy 1250, and a web event handler 1255. There is a proxy mechanism (shown as proxy 1250) from the model (DOM tree 1010) to the JavaScript program. Also the DOM tree 1010 and JavaScript program are both internal to the layout engine. The native application controller 110 performs a load operation 1220 to initialize an event (1240) in the DOM tree 1010. The Web event handler 1255 then handles the event and performs a callback via the execute 1260.

In FIG. 13, native event targets are realized by a custom JavaScript library calling back through the JavaScript bridge (as indicated by the execute call 1260). Application developers can accept the default behavior on the event tree or stop event propagation using standard JavaScript. The complete set of native events are defined by the JavaScript library and implemented by the native renderer.

FIG. 14 shows a simplified example of injecting a mouse click event into an instantiated web view. The injection occurs via the load 1220, and is also illustrated by the JavaScript bridge call 1465.

Figure 15:
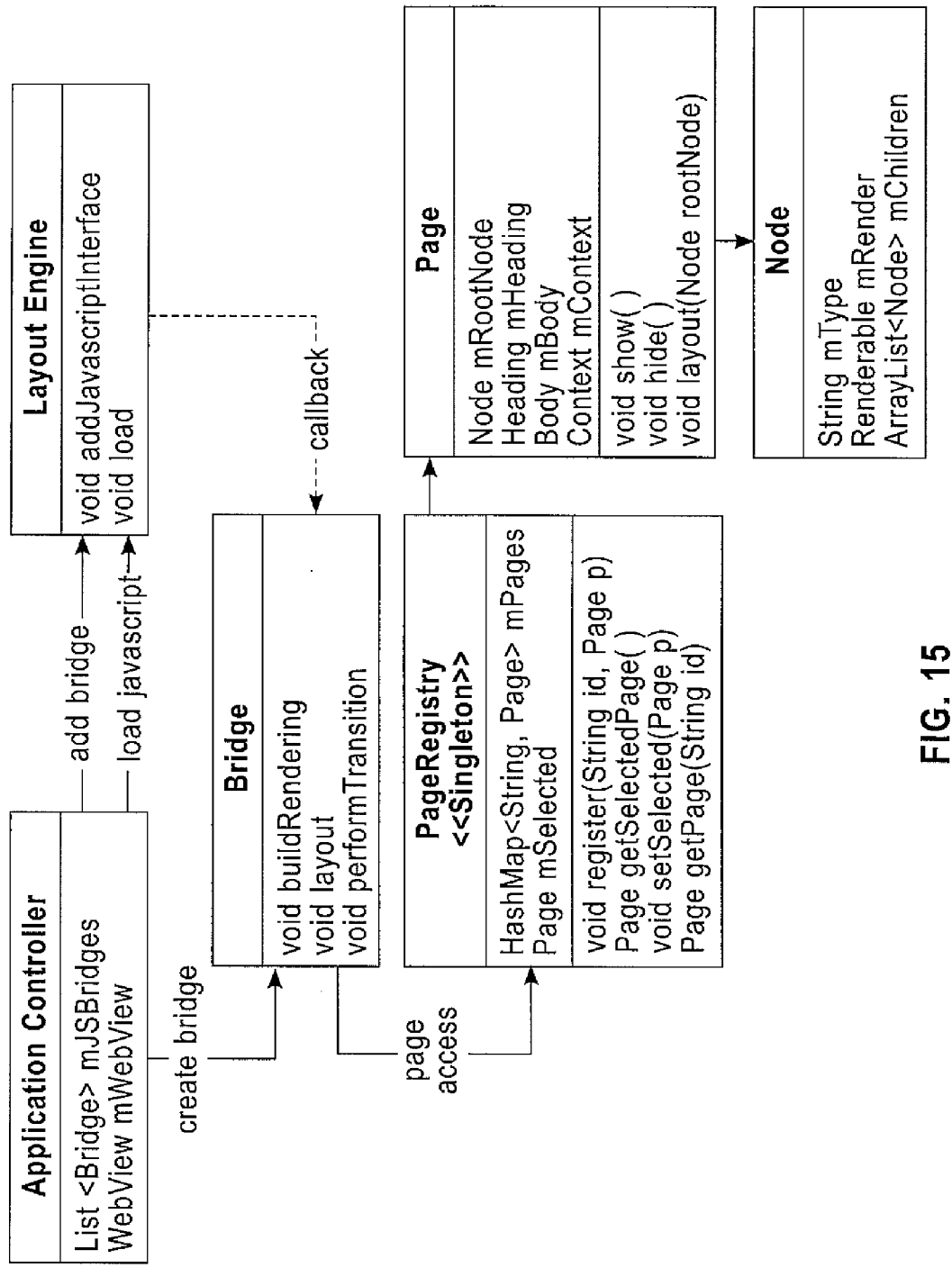
FIG. 15 is a class diagram of an application controller that incorporates native UT rendering in accordance with an exemplary embodiment of the instant invention.

Turning now to FIG. 15, a generalized class diagram is shown of an application controller that incorporates the native UI renderer 630 (see FIG. 9) in accordance with an exemplary embodiment of the instant invention. In this example, the Application Controller corresponds to the native hybrid application 1115. In this example, when the web vies is instantiated by the controller object of the application (i.e., an instantiated version of Application Controller), the controller object loads a custom JavaScript library that walks through the DOM calling back through the bridge to the native renderer to perform basic layout and rendering. The buildRendering method of the Bridge object performs the functions of the JavaScript library 920 in this example. BuildRendering and performTransition are the actual callbacks on the native side of the renderer. Layout is the operation that is called once all of the renderings are done (e.g., meaning the DOM traversal on the web side is finished and buildRendering is no longer being called). HashMap and the like are standard functions known in the field.

Figure 16:
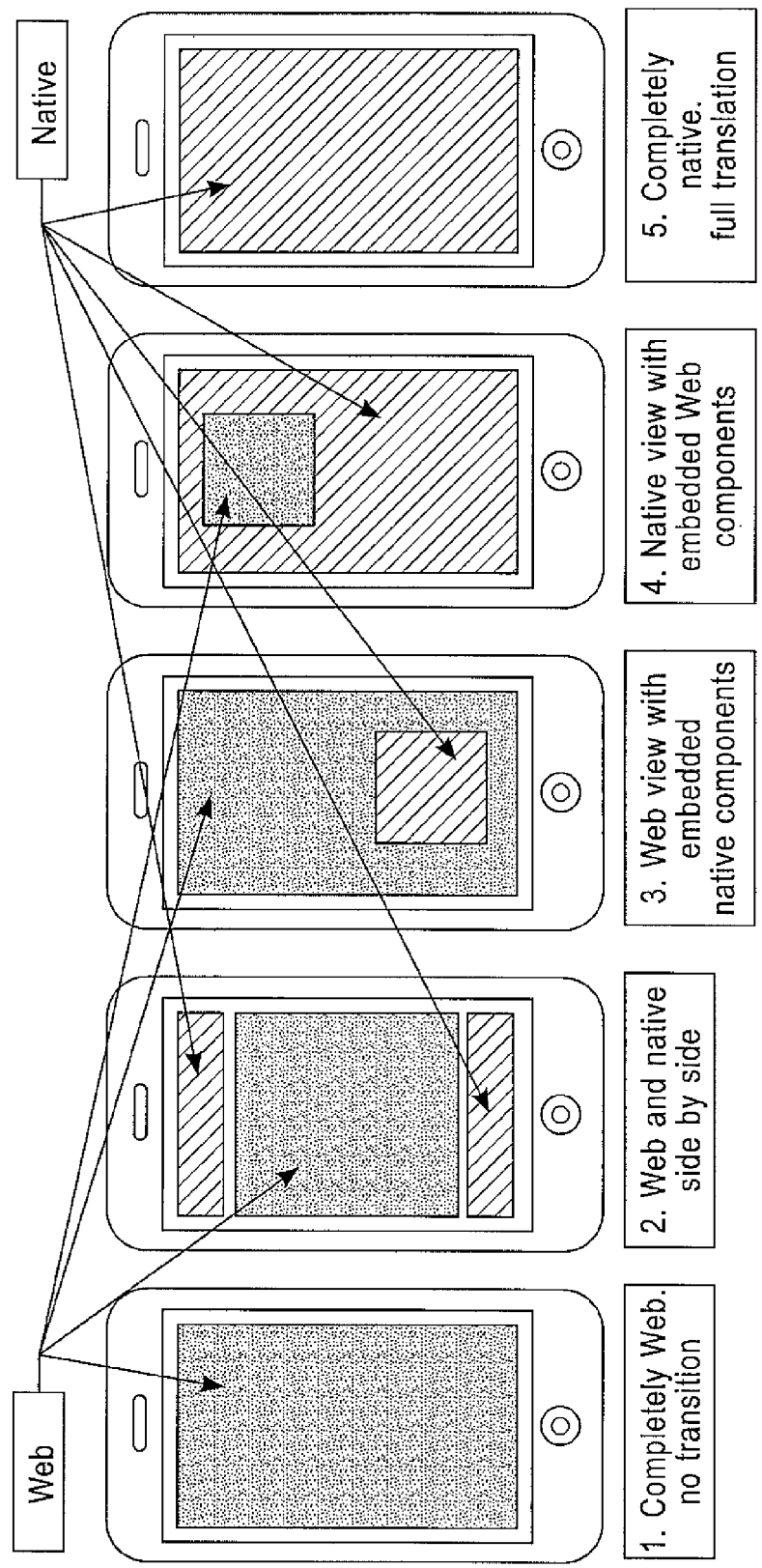
FIG. 16 is an illustration of mixing native and Web views.

The exemplary embodiments are very flexible because these allow for mixing native and Web views as is shown in FIG. 16. Broadly, a continuum of possible configurations are supported:

1) Web UI components can be completely replaced by native UI components, as illustrated by "5. Completely native, full translation" in FIG. 16.

2) Web components can host native components (see 3 of FIG. 16) and native components can host Web components (see 4 of FIG. 16).

3) Web and native components can coexist, as shown in 2 of FIG. 16.

Figure 17:
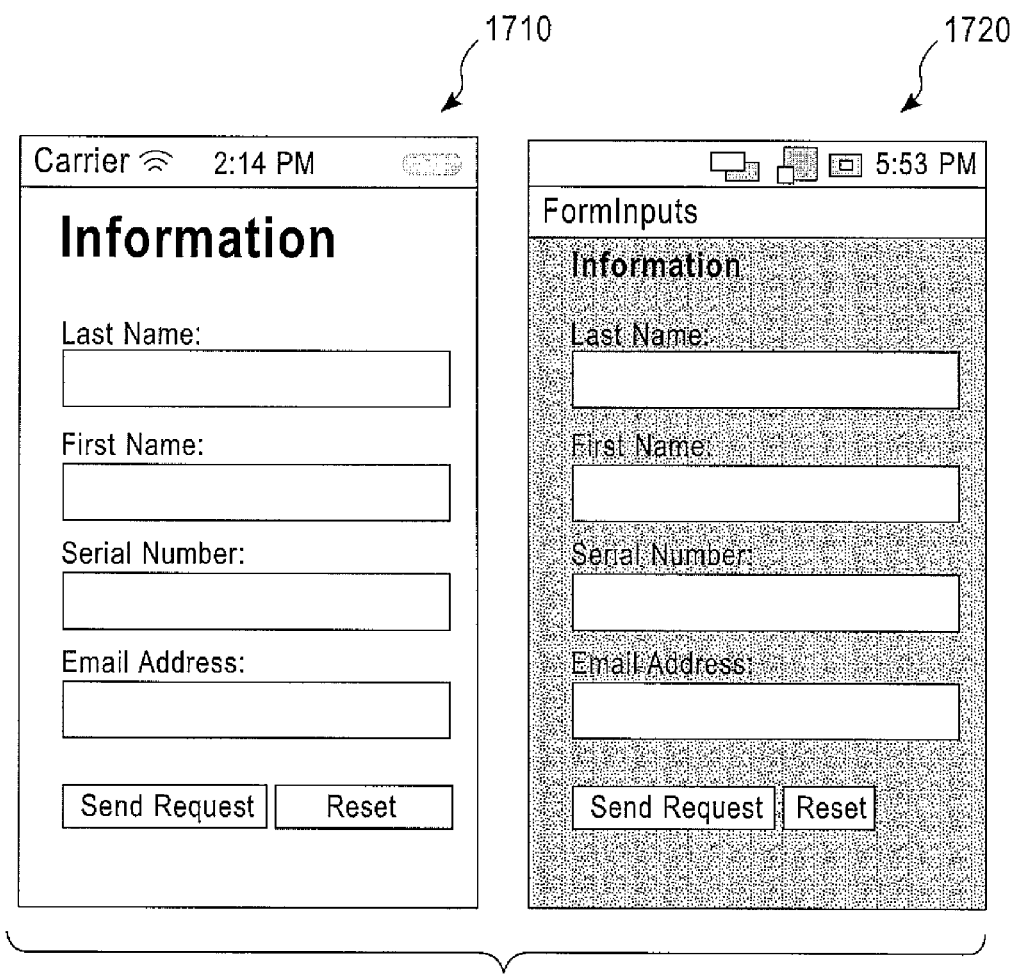
FIG. 17 includes screen shots of the same application that is rendered on two different platforms.

The screen shots in FIG. 17 show how the same application, written in pure HTML5 and JavaScript, can render natively on both the Android platform (illustrated by 1720) and the iOS platform (illustrated by 1710). The rendered native user interface elements are the rendered buttons "Send Request" and "Reset", the rendered page entitled "Information", and the rendered information boxes for "Last Name", "First Name", "Serial Number", and "Email Address".

This simple form-based Web application, if implemented natively, would require 353 lines of Objective-C code for the iOS platform and 137 lines of Java code for the Android platform, for a total of 490 lines of native code. With the instant approach, just HTML code is necessary since that code will be dynamically translated into native UI code. The total amount of code to write this application using HTML and JavaScript is only 27 lines. Therefore, the exemplary embodiments herein (as in this example) allows for writing code that is 18 times smaller, which corresponds to a 94.5% decrease. Another advantage of the exemplary embodiments herein is that natively, the code would need to be designed and developed using native proprietary tools. With the instant approach, instead, applications are written in simple Web languages (or even auto-generated), and deployed on a Web application server—No deep native programming skills are required.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Acronyms that appear in the text or drawings are defined as follows.
API Application Programming Interface
DOM Document Object Model
HTML HyperText Markup Language
I/F interface
JS JavaScript
UI User Interface
XHTML extensible HTML
XML extensible Markup Language

What is claimed is:

1. A computing device comprising an operating system and comprising:
one or more memories comprising computer-readable code; and
one or more processors, configured in response to executing the computer-readable code to cause the computing device to perform:
causing elements to be recognized that correspond to one or more browser-supported programming languages in an application by traversing a model of at least a portion of the application, wherein the recognized elements are those elements in the model that can be converted to native user interface elements in the operating system and rendered on a display of the computing device;
converting the elements in the one or more browser-supported programming languages to native user interface elements; and
causing the native user interface elements to be rendered on the display of the computing device, wherein a native rendering process performs at least the converting the elements and causing the native user interface elements to be rendered and a web rendering process performs at least the causing the elements to be recognized, and wherein the computing device is further caused to perform:
performing a web rendering of the application and a native rendering of the application in parallel, at least by:
the web rendering process, in response to a change in the model, calling the native renderer process to cause the native rendering process to render native user interface elements corresponding to recognized elements in a changed portion of the model; and the native rendering process, in response to an event occurring in the native rendering, injecting code corresponding to the event into the web rendering process to cause the web rendering process to react to the event, wherein the web rendering of the application comprises elements rendered by the web rendering process that are not recognized by traversing the model; and causing the web rendering process to be hidden from the display.

2. The computing device of claim 1, wherein the one or more browser-supported programming languages comprise one or both of hypertext markup language or JavaScript.

3. The computing device of claim 1, wherein causing the native elements to be rendered on a display of the computing device further comprises causing an operating system of the computing device to render the native elements on the display.

4. The computing device of claim 3, wherein the operating system comprises one of iOS, Android, or Windows.

5. The computing device of claim 1, wherein the converting the elements further comprises converting each element in the model that can be converted to native user interface elements in the operating system and rendered on the display to a native user interface element in a tree.

6. The computing device of claim 5, wherein the tree further comprises for each native user interface element a renderable type corresponding to the native user interface element.

7. The computing device of claim 5, wherein converting the elements is performed so there is a one-to-one correspondence between elements in the model that can be converted to native user interface elements in the operating system and rendered on the display to a native user interface elements in the tree.

8. The computing device of claim 1, wherein the recognizing is performed because the recognized elements in the model correspond to elements in a library.

9. The computing device of claim 1, wherein both the native rendering process and the web rendering process are performed on the computing device.

10. The computing device of claim 1, wherein the native rendering process is performed on the computing device, but the web rendering process is performed on a device different from the computing device.

11. The computing device of claim 1, further comprising propagating events occurring in the web rendering process to the native rendering process.

12. The computing device of claim 11, wherein converting the elements further comprises converting each element in the model that can be converted to native user interface elements in the operating system and rendered on the display to a native user interface element in a tree; and wherein recognizing elements in the model that can be converted to native user interface elements in the operating system and rendered on a display of the computing device further comprises bridging callbacks into native code performing the native rendering process for at least some of the elements so that during the web rendering process, the native rendering process is called via the callbacks, and, in response to the calls, the native rendering process uses the tree to cause native user interface elements, corresponding to elements in the model and to corresponding native user interface elements in the tree, to be rendered on the display.

13. The computing device of claim 1, wherein in response to an event in the native rendering process, the native rendering process causes the event to be injected in the model and causes the model to operate on the injected event.

14. The computing device of claim 1, wherein the display is one or more of a touchscreen, flatscreen, monitor, television, or projector.

15. The computing device of claim 1, wherein causing the native user interface elements to be rendered on a display of the computing device further comprises positioning renderables corresponding to native user interface elements, marking the renderables as ready to draw, and causing the computing device to render the renderables.

16. The computing device of claim 1, wherein causing the web rendering process to be hidden from the display comprises at least one of:

performing the web rendering in a video scratch area, performing the web rendering outside the viewable area of the screen, and disabling output from the web rendering process to the display.

17. A computer program product, comprising a non-transitory computer readable storage medium having computer readable program code embodied therewith, the computer readable program code comprising code for:

causing elements to be recognized that correspond to one or more browser-supported programming languages in an application by traversing a model of at least a portion of the application, wherein the recognized elements are those elements in the model that can be converted to native user interface elements in the operating system and rendered on a display of the computing device;

converting the elements in the one or more browser-supported programming languages to native user interface elements;

causing the native user interface elements to be rendered on the display of the computing device, wherein a native rendering process performs at least the converting the elements and causing the native user interface elements to be rendered and a web rendering process performs at least the causing the elements to be recognized, and wherein the computing device is further caused to perform:

performing a web rendering of the application and a native rendering of the application in parallel, at least by:

the web rendering process, in response to a change in the model, calling the native renderer process to cause the native rendering process to render native user interface elements corresponding to recognized elements in a changed portion of the model, and the native rendering process, in response to an event occurring in the native rendering, injecting code corresponding to the event into the web rendering process to cause the web rendering process to react to the event, wherein the web rendering of the application comprises elements rendered by the web rendering process that are not recognized by traversing the model; and causing the web rendering process to be hidden from the display.

18. The computer program product of claim 17, wherein causing the web rendering process to be hidden from the display comprises at least one of:
  performing the web rendering in a video scratch area,
  performing the web rendering outside the viewable area of the screen, and
  disabling output from the web rendering process to the display.

\* \* \* \* \*